United States Patent
Mazaika et al.

(10) Patent No.: US 8,055,041 B2
(45) Date of Patent: Nov. 8, 2011

(54) ROBUST MOTION CORRECTION FOR FUNCTIONAL MAGNETIC RESONANCE IMAGING

(75) Inventors: Paul K. Mazaika, Palo Alto, CA (US); Gary H. Glover, Stanford, CA (US); Allan L. Reiss, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 641 days.

(21) Appl. No.: 12/288,854

(22) Filed: Oct. 22, 2008

(65) Prior Publication Data

US 2009/0103795 A1 Apr. 23, 2009

Related U.S. Application Data

(60) Provisional application No. 61/000,140, filed on Oct. 23, 2007.

(51) Int. Cl.
*G06K 9/00* (2006.01)
(52) U.S. Cl. ............... 382/128; 382/131; 382/294
(58) Field of Classification Search ........... 382/128, 382/131, 294
See application file for complete search history.

(56) References Cited

U.S. PATENT DOCUMENTS

| | | | |
|---|---|---|---|
| 6,181,832 B1 | 1/2001 | Maas, III | |
| 6,404,196 B1 | 6/2002 | Duerk et al. | |
| 6,470,202 B2 | 10/2002 | Rosenfeld | |
| 7,127,092 B2* | 10/2006 | Jack et al. | 382/128 |
| 7,616,783 B2* | 11/2009 | Valadez | 382/107 |
| 7,787,927 B2* | 8/2010 | Wood et al. | 600/407 |
| 2004/0171927 A1 | 9/2004 | Lowen et al. | |

OTHER PUBLICATIONS

Mazaika et al., "Artifact Repair of fMRI data from High Motion Clinical Subjects (with new results from 3-D large motion correction)," Human Brain Mapping annual meeting, Jun. 13, 2007.
Mazaika et al., "Detection and Repair of Transient Artifacts in fMRI Data," Human Brain Mapping annual meeting, 2005.
Grootoonk et al., "Characterization and Correction of Interpolation Effects in the Realignment of fMRI Time Series", NeuroImage 11,49-57 (2000).
Johnstone et al., "Motion Correction and the Use of Motion Covariates in Multiple-Subject fMRI Analysis," Human Brain Mapping 27:779-788(2006).
Oakes et al., "Comparison of fMRI motion correction software tools," NeuroImage 28 (2005) 529-543.
Liao et al., "Isolation and minimization of head motion-induced signal variations in fMRI data using independent component analysis," Magnetic Resonance in Medicine, 55(6), 2006. Abstract.
Liao et al., "Improved Motion Correction of fMRI Time-Series Corrupted with Major Head Movement Using Extended Motion-Corrected Independent Component Analysis," in Computer Vision for Biomedical Image Applications, Springer, 2005. Abstract.

(Continued)

*Primary Examiner* — Wai Sing Louie
(74) *Attorney, Agent, or Firm* — Lumen Patent Firm

(57) ABSTRACT

A computer-implemented method to correct motion and interpolation effects for functional magnetic resonance imaging (fMRI) analysis is provided. The method estimates the motion on every voxel of the data and removes those effects to leave a residual signal that can be analyzed to high accuracy. The estimation of the motion includes solving a normal matrix equation based on the local translational motion of each voxel of the head, and a regularization parameter that depends on the local spatial structure of the head. Methods to regularize a matrix from the normal equation using the regularization parameter are also provided. A rolling filter implementation for real-time processing and motion correction is provided.

17 Claims, 4 Drawing Sheets

OTHER PUBLICATIONS

Jiang et al., "Motion detection and correction in functional MR imaging," Human Brain Mapping, vol. 3, No. 3. (1995). Abstract.

Kim et al., "Motion correction in fMRI via registration of individual slices into an anatomical volume," Magnetic Resonance in Medicine, 41(5), 1999. Abstract.

Friston et al., "Movement related effects in fMRI time-series," Magnetic Resonance in Medicine, vol. 35 (1996), pp. 346-355.

Mazaika, P., "Choosing the best group, and other methods for clinical fMRI data," National Institute of Mental Health Colloquium, Jul. 1, 2008.

Mazaika et al., "Data Repair and Motion Correction for clinical subject fMRI data," Stanford fMRI Colloquium, Aug. 13, 2007.

* cited by examiner $$u = \begin{pmatrix} u_1 \\ u_2 \\ \vdots \\ u_N \end{pmatrix} \qquad g = \begin{pmatrix} g_1 \\ g_2 \\ g_3 \\ g_4 \\ g_5 \\ g_6 \\ g_7 \end{pmatrix}$$

$$M = \begin{bmatrix} \sin(x_1) & 1-\cos(x_1) & \sin(y_1) & 1-\cos(y_1) & \sin(z_1) & 1-\cos(z_1) & 1 \\ \sin(x_2) & 1-\cos(x_2) & \sin(y_2) & 1-\cos(y_2) & \sin(z_2) & 1-\cos(z_2) & 1 \\ \cdots & & & & & & \cdots \\ \sin(x_i) & 1-\cos(x_i) & \sin(y_i) & 1-\cos(y_i) & \sin(z_i) & 1-\cos(z_i) & 1 \\ \cdots & & & & & & \cdots \\ \sin(x_N) & 1-\cos(x_N) & \sin(y_N) & 1-\cos(y_N) & \sin(z_N) & 1-\cos(z_N) & 1 \end{bmatrix}$$

ROBUST MOTION CORRECTION FOR FUNCTIONAL MAGNETIC RESONANCE IMAGING

CROSS-REFERENCE TO RELATED APPLICATIONS

This application claims priority from U.S. Provisional Patent Application 61/000,140 filed Oct. 23, 2007, which is incorporated herein by reference.

STATEMENT OF GOVERNMENT SPONSORED SUPPORT

This invention was made with Government support under contract K25 MH077309 awarded by National Institute of Mental Health. The US Government has certain rights in the invention.

FIELD OF THE INVENTION

The invention relates generally to functional magnetic resonance imaging (fMRI). More particularly, the present invention relates to motion correction for fMRI.

BACKGROUND

Clinical subjects often have large and rapid movements during a functional magnetic resonance imaging (fMRI) scan session, and both of these types of errors need to be avoided or corrected for a successful analysis. Many current clinical data sets cannot be analyzed because of subject motion during the scan session. Head motion causes failures in fMRI analysis and a great deal of effort has been expended to train subjects to be motionless, or constrain their heads in the scanner via packed pillows, bite bars, or custom head cast. These physical constraints are unpleasant at best, and not possible to use on many young, old, or disturbed subjects of interest.

Methods have been developed to attempt to correct for subject motion without solely relying on physical constraints. The first step in fMRI processing is to realign the data so all the images are registered to each other. Even after realignment and interpolation, there is unavoidable residual time series errors caused by the subject's movements. These errors occur regardless of the interpolation algorithm that is used because the spatial high frequency structure of the brain cannot be adequately captured with any interpolation algorithm using data samples that are spatially far apart. In other words, the errors are inherent due to limited spatial resolution of the data samples compared to brain structures of interest. Techniques using motion regressors in the design matrix during fMRI analysis have been developed to correct for motion correction. However, these existing techniques have not been effective against typical subject motions in high motion clinical data sets. In fact, those techniques are completely unusable for many high motion data sets. Technical papers relating to these techniques include Friston et al., "Movement related effects in fMRI time-series," Magnetic Resonance in Medicine, Vol. 35 (1996), pp. 346-355 and Grootoonk et al., "Characterization and Correction of Interpolation Effects in the Realignment of fMRI Time Series", NeuroImage 11, 49-57 (2000). Grootoonk et al. utilizes a principle component analysis (PCA) that approximates the variations in intensity due to subject motion by using two functions: sine and cosine. However, the method of Grootoonk et al. fails to transition smoothly in the limit of low subject motion. This failure is unavoidable due to the functions that naturally arise as a consequence of the PCA in the algorithm of Grootoonk et al. Furthermore, the method of Grootoonk et al. is based on faulty assumptions by addressing the issue of poor interpolation algorithms and fails to appreciate the issue that actual fine-grain brain structure makes even perfect interpolation algorithms fail.

Existing techniques for motion correction in fMRI also suffer from difficulties with regularization. In particular, many existing techniques are over-regularized, causing errors for the corrected motion. Current fMRI motion correction algorithms also rely on poorly aligned images, thereby introducing unreliable results. In addition, many existing algorithms require many reads of the images to be corrected, which is computationally and time inefficient.

SUMMARY OF THE INVENTION

The present invention is directed to a method of correcting motion for functional magnetic imaging (fMRI). The method includes having a plurality of aligned images, where the voxels of each image corresponds to the voxels of another image. The alignment provides one or more translational distances between the voxels in each image with the corresponding voxels in another image. Alternatively or additionally, the method can include calculating the translational distances for each voxel. A time-series vector is defined for each voxel to represent the value of the corresponding vectors over a number N of images. A motion correction estimator is calculated for each voxel based on the time-series vector and a plurality of correction parameters, such as nonlinear parameters. The correction parameters are based on the translational distances, are approximately periodic in the size of the voxels, and approach zero when the translational distances approach zero. Each voxel is corrected based on the motion correction estimator.

In an embodiment of the present invention, one or more of the aligned images are removed and excluded in the calculation of the motion correction estimator. Images can be removed based on a shift of one or more voxels from one image to another. In particular, an image can be removed when the shift is greater than a threshold shift. In an embodiment, the threshold shift is iteratively changed based on the number or percentage of images to be removed.

In an embodiment of the present invention, the translation distances used in calculating the motion correction estimator approximates the translational and rotational motion of the whole head and are in one more translational directions. In a preferred embodiment, the calculation of the motion correction estimator for one of the voxels includes solving a normal equation having one or more matrices. Optionally, at least one of the matrices of the normal equation is regularized by setting a minimum value for one or more of the diagonal elements of the matrix. In a preferred embodiment, the regularization is based on one or more spatial gradients or curvatures of the images. In particular, regions of an image having higher spatial gradient have a lower minimum regularization value than regions of an image having lower spatial gradient.

A rolling filter implementation is also provided, wherein each of the images are read at most twice. In the first reading, the motion correction estimator is calculated for all of the voxels and the corrected images are written during the second reading. The rolling filter implementation facilitates motion correction for partial data sets.

BRIEF DESCRIPTION OF THE FIGURES

The present invention together with its objectives and advantages will be understood by reading the following description in conjunction with the drawings, in which:

FIG. 3 shows matrices and equations used in an embodiment of the present invention.

DETAILED DESCRIPTION OF THE INVENTION

Large and rapid movements by a subject during a functional magnetic resonance imaging (fMRI) scan session cause errors that need to be corrected for a successful analysis. The first step in fMRI processing is to align the data so all the images are registered to each other, However, even after alignment and interpolation, there are unavoidable residual time series caused by subject motion. It is important to note that these errors occur regardless of the interpolation algorithm that is used because the spatial high frequency structure of the brain cannot be adequately captured with any interpolation algorithm. The present invention is directed to a robust method for correcting residual effects from large motions.

An fMRI analysis utilizes a set of successive images, with all images having a large number of voxels. A typical fMRI image has approximately 80,000 voxels. The fMRI images are generally aligned after they are captured. Alignment includes corresponding the voxels of one image with another image to derive one or more translational distances and/or rotations between corresponding voxels of multiple images. Typically, the translations and rotations are provided with respect to a reference image.

Figure 1:
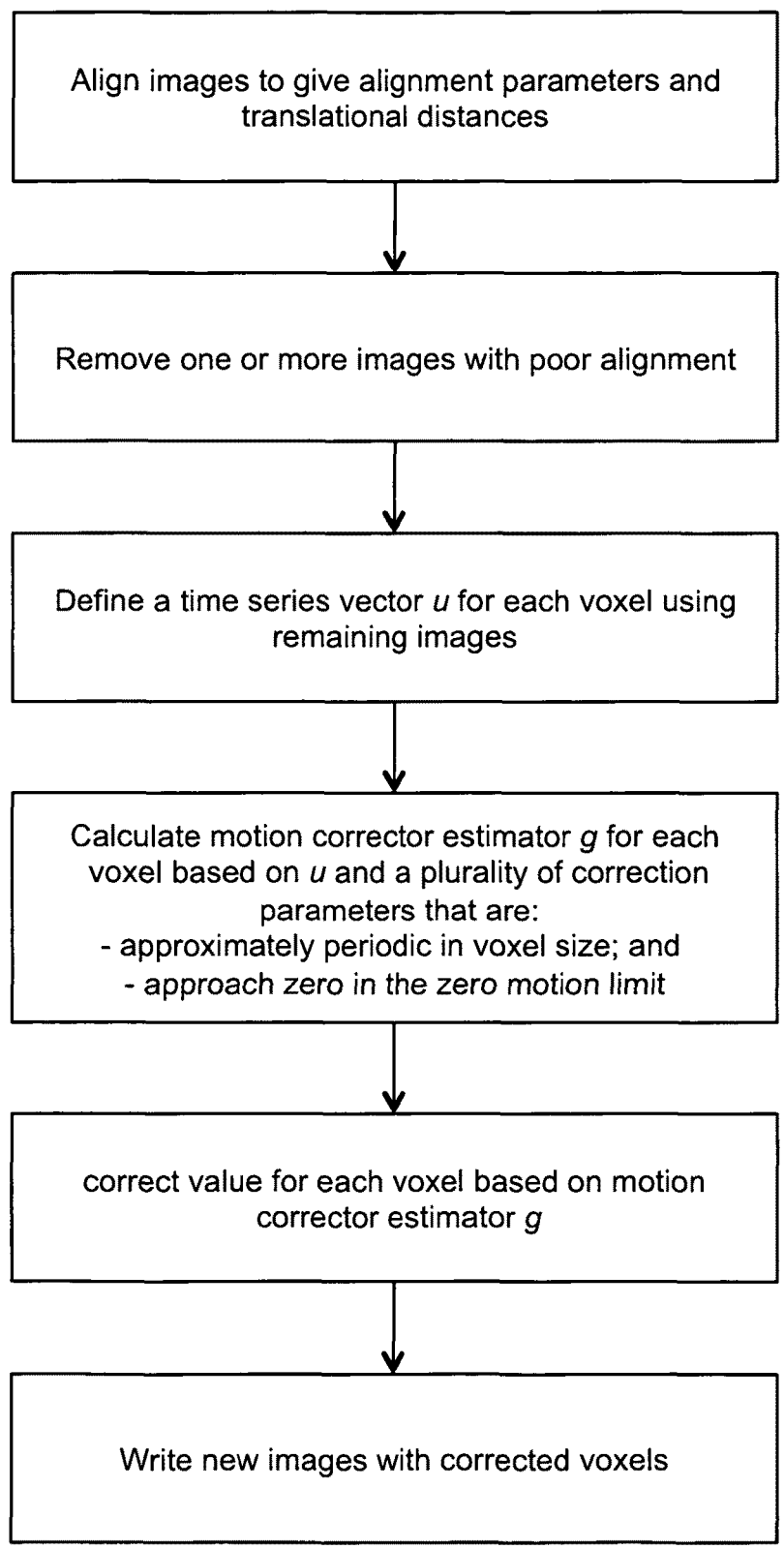
FIG. 1 shows a flow chart of an example method for correcting motion for fMRI images according to the present invention.

FIG. 1 shows a flow chart of a motion correction method of the present invention. In the embodiment shown in FIG. 1, the method requires alignment of the raw images that are captured. In a preferred embodiment, the motion correction method of the present invention uses an algorithm that takes as input the alignment parameters and the aligned, sliced images. In other words, the method can be applied to images that have already been realigned. In either case, the algorithm estimates and removes residual motion effects for each voxel, and writes a new set of images where the motion effects have been suppressed FIG. 1 shows an optional step of removing one or more images for which the alignment parameters are likely to be incorrect. This step is important for clinical subjects because the large rapid motions of clinical subjects can cause errors in the alignment calculation and the errors are likely to propagate to the estimate of motion correction. In an embodiment, images are removed based on the shift or root mean square (RMS) deviation of one or more voxels from one image to another image. In particular, the determining characteristic is whether voxels near the outside of the brain shifts by more than a threshold distance from one image to the next or another image. In a preferred embodiment, the RMS of the motions of six voxels at 65 mm distance from the origin is computed and compared with a threshold shift of 0.5 mm, wherein if the RMS is greater than the threshold shift, the image is removed. It is noted that any number and selection of voxels, and any threshold shift can be used to determine removal of images. In an embodiment, the shift threshold is iteratively changed based on a number or percentage of images to be removed. For example, if more than 25% of the images are recommended for exclusion, the specified distance threshold is increased until fewer than 25% of the images will be excluded.

After removal of the poorly aligned images, N images remain for use in the motion correction algorithm. For each voxel, a time series vector u is defined, where the elements of u represent the value of the corresponding voxels over the N remaining images. In an embodiment the time series vector u is defined with respect to a baseline value $u_o$. A motion correction estimator g is then calculated for each voxel, where the calculation is based on the time series vector u of the same voxel and one or more correction parameters.

It is important to note that the correction parameters used to calculate g are approximately periodic in voxel size and approach zero in the zero motion limit. Using correction parameters with these properties allows for accurate motion correction that extrapolates correctly in the limit of small motion. In a preferred embodiment, the values of the voxel in every image, including the removed images, are then corrected based on the motion correction estimator g. New images are then written with the corrected voxels.

Figure 2:
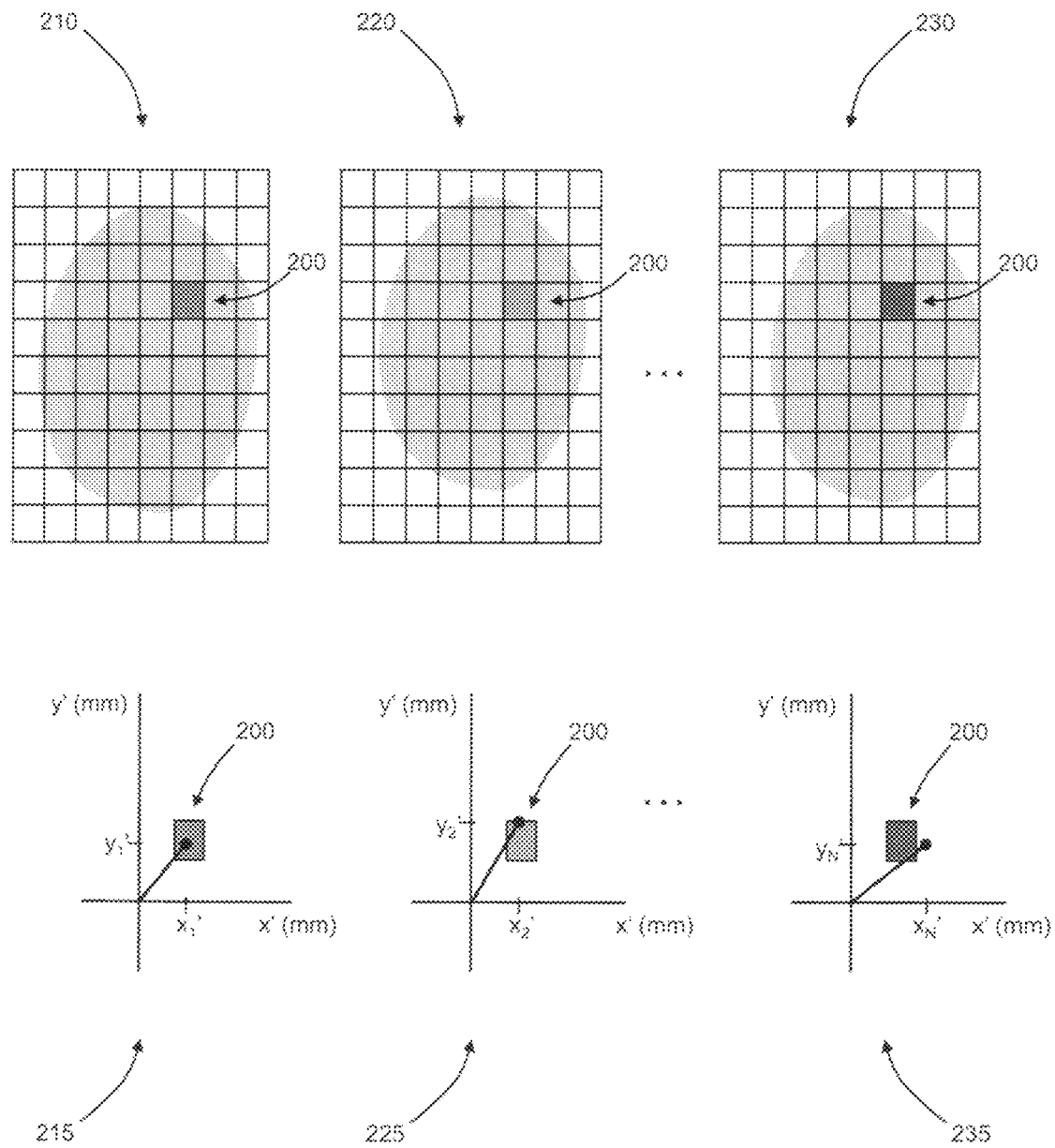
FIG. 2 shows an example set of fMRI images with subject motion according to the present invention.

FIG. 2 shows an example of multiple aligned fMRI images 210-230. The alignment corresponds the voxels of one image to another image. For example, corresponding voxel 200 is highlighted in images 210-230. FIG. 2 also shows example plots displaying residual motion in the images 210-230. In an embodiment of the present invention, the translations and rotations of the whole head are locally approximated as translational distances on the voxel. For example, $x_2'$ is the approximate translational distance (in mm) in the x direction for the second image and $y_2'$ is the approximate translational distance in the y direction. Though FIG. 2 shows only two-dimensional plots, embodiments of the present invention are preferably directed to, but not limited to, three-dimensional motion.

As mentioned above, a time series vector u is defined for each voxel, where u is an N by 1 vector as shown in FIG. 3. In a preferred embodiment, the motion correction estimator g is a 7 by 1 vector and is the solution to the equation: u=Mg, where M is an N by 7 matrix with $i^{th}$ row: $M_i=[\sin(x_i) 1-\cos(x_i) \sin(y_i) 1-\cos(y_i) \sin(z_i) 1-\cos(z_i) 1]$, and as shown in FIG. 3. The elements of matrix M include the correction parameters. In the embodiment shown in FIG. 3, the elements of matrix M include correction parameters that are functions of the translational distances. For example, $x_N$ in elements 310 are functions of $x_N'$ by the following transformation: $x_N=2\pi x_N'/v_x$, where $v_x$ is the voxel size in the x direction. In other words, $x_N'$ is the distance in the x direction for the $N^{th}$ image relative to the voxel size. Translations in the y and z directions are expressed similarly. It is noted that $x_i$, $y_i$, and $z_i$ can be different for every image and different for every voxel.

A "normal" equation 320, $g=(M^TM)^{-1}M^Tu$, used to calculate the motion correction estimator g in an embodiment of the present invention. In a preferred embodiment, the matrix $M^TM$ is regularized before inversion. In one embodiment, regularizing includes setting a minimum value for one or more of the diagonal elements of matrix $M^TM$ The minimum value must be small so that important gray matter voxels near the surface of the brain can be adequately corrected even for large motions, yet it cannot be too small, or the solution will become unstable. For example, regularization values within 0.001 and 0.01 give acceptable results with 64-bit arithmetic. In an embodiment, all of the diagonal elements of matrix $M^TM$ are set to have a minimum value of about 0.005. Alternate embodiments could use other minimum values or alternate regularizing schemes, such as adding a small value to the diagonal elements of $M^TM$, can be employed.

In an embodiment of the present invention, one or more matrices used in calculating the motion correction estimator is regularized based on spatial gradients of the images, spatial curvatures of the images, one or more alignment parameters, or any combination thereof. For example, an image has multiple regions, one of which has a higher spatial gradient or curvature than another region. The minimum value used in regularizing is set to be lower for the high gradient region than for the low gradient region. In an embodiment, the minimum value ranges from 0.005 to 0.05 for a high gradient region and is greater than 1 for a low gradient region.

In an embodiment, the motion correction estimator g can be stored as seven three-dimensional images for each voxel. The stored images are related to the seven elements of the vector g and can be stored for user review.

The value of each voxel is corrected based on the motion correction estimator g associated with the same voxel. In a preferred embodiment, the motion corrected time series v of a voxel is an N by 1 vector and is calculated from the equation: $v=u-Mg+u_o$, where u, M, g, and $u_o$ are as described in the preceding paragraphs. It is noted that in a preferred embodiment, the motion correction is applied to all images, including those excluded from use during the calculation of the motion correction estimator g. The corrected images can be written for use by succeeding stages of fMRI processing, such as artifact repair, normalization, smoothing, and estimation.

Figure 4:
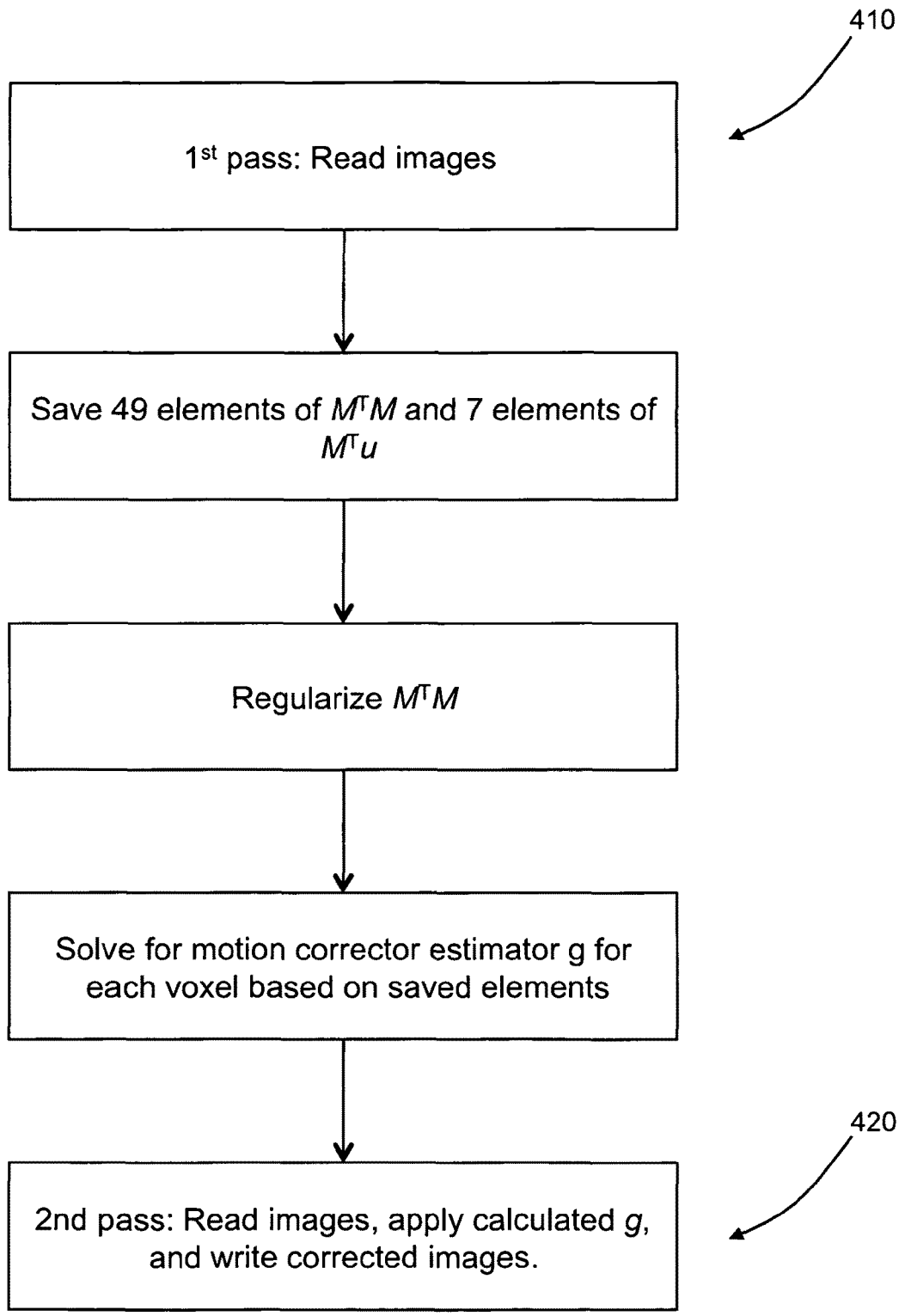
FIG. 4 shows a flow chart of a rolling filter embodiment according to the present invention.

Motion correction generally requires substantial amount of time and computational power since the calculations described above are performed for every voxel and there are typically about 80,000 voxels per image. To alleviate this large time-consumption, an embodiment of the present invention is directed to a rolling filter implementation where the images are only read at most twice, as shown in FIG. 4. In the embodiment of FIG. 4, all of the voxels in an image are processed in parallel or at approximately the same time. The first pass 410 through the images accumulates all of the terms needed to solve for g. Using this approach, it is only necessary to save the 49 images of $M^TM$ and the 7 images of $M^Tu$ to solve for g at every voxel simultaneously. Optionally, the matrices $M^TM$ can be regularized. The second pass 420 through the images applies the motion correction estimator g for every voxel and writes the motion corrected images. In this embodiment, motion correction takes less time than a typical realignment step in fMRI processing. In addition, the rolling filter implementation can be applied to partial data sets, hence, the approach could be used progressively from image to image as a basis to provide real-time image correction for fMRI.

As one of ordinary skill in the art will appreciate, various changes, substitutions, and alterations could be made or otherwise implemented without departing from the principles of the present invention, e.g. the present invention can be applied to any set of images of any dimension. Accordingly, the scope of the invention should be determined by the following claims and their legal equivalents.

What is claimed is:

1. A method of correcting motion for functional magnetic resonance imaging (fMRI), said method comprising:
   (a) having a plurality of images, wherein each of said images has a plurality of voxels, wherein said images are aligned, wherein said alignment corresponds said voxels of each of said images with said voxels of another of said images, and wherein said alignment provides one or more translational distances between said voxels in each of said images with said corresponding voxels in another of said images;
   (b) defining a time-series vector for each of said voxels, wherein said time-series vector represents the value of said corresponding voxels over a number N of said plurality of aligned images;
   (c) calculating a motion correction estimator for each of said voxels, wherein said motion correction estimator is calculated based on said time-series vector and a plurality of correction parameters, wherein said correction parameters can be different for each of said N images, wherein said correction parameters are based on said translational distances of said corresponding voxels, and wherein said correction parameters are:
      (i) approximately periodic in the size of the same said voxels; and
      (ii) approach zero if said translational distances approach zero; and
   (d) correcting the value of each of said voxels of said plurality of images based on said motion correction estimator and said time-series vector for each of said voxels.

2. The method as set forth in claim 1, further comprising calculating said translational distances for each of said voxels for said N images.

3. The method as set forth in claim 1, further comprising removing one or more of said aligned images, wherein said removed images are excluded from said N images used in calculating said motion correction estimator.

4. The method as set forth in claim 3, further comprising correcting the value of each of said voxels of said removed images, wherein said correcting is at least partially based on said motion correction estimator for said corresponding voxel of said N images.

5. The method as set forth in claim 3, further comprising:
   (i) determining a shift of one or more of said voxels from one of said images to another of said images; and
   (ii) comparing said shift to a threshold, wherein the same of said images is removed based on said comparison.

6. The method as set forth in claim 5, further comprising iteratively changing said threshold based on a number of said images to be removed.

7. The method as set forth in claim 1, wherein said translational distances approximate translational and rotational motion, wherein said translational distances are in one or more translational directions, wherein said correction parameters of the $i^{th}$ image comprise $\sin(x_i)$ and $1-\cos(x_i)$ for one of said translational directions, and wherein $x_i$ is proportional to said translational distance relative to said voxel size in the same of said translational directions.

8. The method as set forth in claim 1, wherein said time-series vector of one of said voxels is defined by the equation $u=Mg$,
   wherein u is said time-series vector and is an N by 1 vector, g is said motion correction estimator and is a 7 by 1 vector, and M is an N by 7 matrix, and wherein the $i^{th}$ row of matrix M is defined by the equation:

$M_i = [\sin(x_i)\ 1-\cos(x_i)\ \sin(y_i)\ 1-\cos(y_i)\ \sin(z_i)\ 1-\cos(z_i)\ 1]$, wherein $x_i$ is proportional to said translational distance relative to the voxel size in a x-direction, wherein $y_i$ is proportional to said translational distance relative to the voxel size in a y-direction, and wherein $z_i$ is proportional to said translational distance relative to the voxel size in a z-direction.

9. The method as set forth in claim 8, wherein said motion correction estimator is calculated from a normal equation: $g=(M^TM)^{-1}M^Tu$.

10. The method as set forth in claim 9, further comprising regularizing said matrix $M^TM$.

11. The method as set forth in claim 10, wherein said regularizing comprises setting a minimum value for one or more of the diagonal elements of said matrix $M^TM$, and wherein said minimum value is set based on one or more spatial gradients of said images, one or more spatial curvatures of said images, or any combination thereof.

12. The method as set forth in claim 1, further comprising reading each of said plurality of images, wherein each of said images are read at most twice, and wherein said motion correction estimator is calculated for all of said voxels after the first reading.

13. The method as set forth in claim 1, wherein said correcting comprises defining a corrected time-series vector for each of said voxels, and wherein said corrected time-series vector is at least partially based on said motion correction estimator and said plurality of correction parameters.

14. The method as set forth in claim 13, further comprising writing a plurality of corrected images based on said corrected time-series vectors.

15. The method as set forth in claim 1, wherein said calculating said motion correction estimator for one of said voxels comprises solving a normal equation, wherein said normal equation comprises one or more matrices, and wherein said calculating comprises regularizing at least one of said matrices of said normal equation.

16. The method as set forth in claim 15, wherein said regularizing comprises setting a minimum value for one or more of the diagonal elements of one of said matrices, and wherein said minimum value is set based on one or more spatial gradients of said images, one or more spatial curvatures of said images, or any combination thereof.

17. The method as set forth in claim 16, wherein said images have a plurality of regions, wherein a first of said regions has a higher spatial gradient or curvature than a second of said regions, and wherein said minimum value is lower for said first region than said second region.

* * * * *